United States Patent
Kim et al.

(10) Patent No.: US 9,473,917 B2
(45) Date of Patent: Oct. 18, 2016

(54) ADDRESS-BASED SOCIAL SAFETY NETWORK SYSTEM OF SMART GRID INFRASTRUCTURE DEVICE AND METHOD FOR PROVIDING SAME

(71) Applicant: INNOVID CO., LTD, Seoul (KR)

(72) Inventors: Kyoung-Il Kim, Seongnam-si (KR); Se-Kyung Oh, Seoul (KR); Hyun-Joo Shin, Seoul (KR)

(73) Assignee: INNOVID CO., LTD, Seoul (KR)

( * ) Notice: Subject to any disclaimer, the term of this patent is extended or adjusted under 35 U.S.C. 154(b) by 0 days.

(21) Appl. No.: 14/439,388

(22) PCT Filed: Nov. 16, 2012

(86) PCT No.: PCT/KR2012/009695
§ 371 (c)(1),
(2) Date: Apr. 29, 2015

(87) PCT Pub. No.: WO2014/069706
PCT Pub. Date: May 8, 2014

(65) Prior Publication Data
US 2015/0281931 A1 Oct. 1, 2015

(30) Foreign Application Priority Data
Oct. 29, 2012 (KR) .................. 10-2012-0120829

(51) Int. Cl.
*H04W 4/22* (2009.01)
*G06Q 10/06* (2012.01)
(Continued)

(52) U.S. Cl.
CPC ............. *H04W 4/22* (2013.01); *G06Q 10/063* (2013.01); *G08B 21/02* (2013.01); *H04W 4/008* (2013.01);
(Continued)

(58) Field of Classification Search
CPC ........ H04W 64/00; H04W 4/02; H04W 4/00
USPC ................... 455/456.1–456.5, 404.2
See application file for complete search history.

(56) References Cited

U.S. PATENT DOCUMENTS

| | | | |
|---|---|---|---|
| 8,849,304 B2* | 9/2014 | Pon .................. | H04W 4/02 455/456.1 |
| 8,880,092 B1* | 11/2014 | Cooley .................. | G01S 19/00 340/870.02 |
| 2012/0295578 A1* | 11/2012 | Zonoun ............. | H04M 3/5116 455/404.2 |

FOREIGN PATENT DOCUMENTS

| JP | 2002-199625 A | 7/2002 |
|---|---|---|
| KR | 100722953 B1 | 5/2007 |

(Continued)

OTHER PUBLICATIONS

International Search Report and Written Opinion issued in the corresponding PCT/KR2012/009695 on Jul. 16, 2013.

*Primary Examiner* — Michael T Vu
(74) *Attorney, Agent, or Firm* — Roberts Mlotkowski Safran Cole & Calderon P.C.

(57) ABSTRACT

The present invention provides an address-based social safety network system of a smart grid infrastructure device, the address-based social safety network system comprising: a potable location information terminal for transmitting an emergency signal through a RF modem when an emergency signal generation command is inputted; a digital energy meter which calculates an average value of wireless reception strength of the emergency signal received from the portable location information terminal and then transmits the calculated average value to an upper end; a collection device which collects the emergency signal received from the digital energy meter, and which transmits the collected emergency signal to the upper end; and a positioning server which collects the emergency signal received from the collection device, and which tracks location information of the portable location information terminal by using the wireless receiving sensitivity and an intrinsic identification address of the digital emergency meter.

18 Claims, 5 Drawing Sheets

(51) Int. Cl.
*G08B 21/02* (2006.01)
*H04W 4/00* (2009.01)
*H04W 4/02* (2009.01)
*H04W 64/00* (2009.01)
*H04W 88/02* (2009.01)
*H04W 76/00* (2009.01)

(52) U.S. Cl.
CPC ............ *H04W 4/02* (2013.01); *H04W 64/003* (2013.01); *H04W 64/00* (2013.01); *H04W 76/007* (2013.01); *H04W 88/02* (2013.01)

(56) References Cited

FOREIGN PATENT DOCUMENTS

| | | |
|---|---|---|
| KR | 10-0791781 A | 1/2008 |
| KR | 10-2009-0049491 A | 5/2009 |
| KR | 10-2010-0076346 A | 7/2010 |
| KR | 10-2011-0069276 A | 6/2011 |
| KR | 10-2012-0087770 A | 8/2012 |
| KR | 101182886 B1 | 9/2012 |

* cited by examiner

ADDRESS-BASED SOCIAL SAFETY NETWORK SYSTEM OF SMART GRID INFRASTRUCTURE DEVICE AND METHOD FOR PROVIDING SAME

CROSS-REFERENCE TO RELATED APPLICATIONS

The present application is a U.S. National Phase of PCT/KR2012/009695 filed on Nov. 16, 2012 claiming priority to Korean Patent application No. 10-2012-0120829 filed Oct. 29, 2012. The disclosure of the PCT Application is hereby incorporated by reference into the present application.

TECHNICAL FIELD

The present invention relates to an address-based social safety network system of a smart grid infrastructure device and a method for producing the same which make it possible to provide a more economical and accurate social safety network service in such a way to use an address-based relay device of a previously installed smart grid infrastructure device, for example, an electric power service network, etc. when providing a social safety network service.

BACKGROUND ART

Thanks to a remarkable development in internet and mobile communication technologies, such technologies are increasingly applying to almost fields in our society. For this reason, most of our surroundings is becoming more convenient and abundant in things. One of newly developed and evolving technology sectors by combining the above internet and mobile communication technology is a social safety network service technology sector.

The above social safety network service technology aims to recognize any condition of a person who is currently in an urgent situation or an emergency situation, or a social weaker or the like who needs a constant protection or attention in real time using an internet or mobile communication technology and then to take a proper action as soon as possible. A lot of the related technologies are disclosed in articles, patents or the like.

However, a lot of financial burdens may be necessary to newly construct the whole infrastructure facilities, for example, a relay system for transmitting data, in order to actually implement all the social safety network service system-related technologies which have been already suggested in the corresponding art. More specifically, for a conventional social safety network service system suggested to transmit and receive a data through an exclusive portable positioning information terminal or an exclusive frequency, it needs to newly construct an exclusive system, for example, a relay, etc. corresponding thereto, which inevitably entails a huge amount of initial investment costs.

In order to implement a function, etc. for locating the current location of a user who is in a urgent situation or an emergency situation, the more the tense area of the relay installation, the higher the accuracy of the location detection which is in proportion thereto, so the installation cost increases more and more for the sake of the construction of the useful system. In other words, if the arrangement intervals of the necessary components, for example, a relay, etc. widen in an effort to reduce the initial investment cost, the whole performance of the system may degrade. Enhancing the performance of the system inevitably entails the increased cost which is in proportion thereto.

Meanwhile, in case where a typical location detection system, for example, a GPS system, is used to save the facility-related costs which are necessary for the improvement in the accuracy of location detection, it may properly work in an externally open space, but a problem may occur because normal functions may not work in a closed space, for example, a city area, where a lot of radio interfering matters exist or in the inside of a building.

For example, the Korean patent publication No. 10-2010-0076346 entitled 'a mobile communication terminal and a location information transmission method' and made public on Jul. 6, 2010 discloses a technology for detecting, using a GPS, the location information of a mobile communication terminal that a kid holds or an old man with dementia holds and transmitting to a mobile communication terminal of his protector. However, the above-mentioned problems still remain unsolved As another example, the Korean patent publication No. 10-2012-0087770 entitled 'a wire area total health management system using an IT communication device and ubiquitous network independent exclusive site' and made public on Aug. 7, 2012 discloses a technology for accurately locating the location if an intruder steal a vehicle or a ship in such a way to install a GPS module in the inside of the vehicle or the ship, thus taking back the stolen vehicle or ship, however the earlier problems still remain unsolved.

Meanwhile, in case where a mobile communication-based system is used, wherein it can calculate the location by measuring a location value (Cell-ID) of a base station of a mobile communication service company, a distance between the base station and the terminal, etc., there may still be a problem since the error range is in a range of some kilo meters to a maximum, thus causing a problem because it is hard to locate and rescue the user who is in an emergency situation.

In addition, in case where a WPS (Wi-Fi Positioning System) configured to measure the location value of a terminal by inquiring the location of the WiFi AP (Access Point) is used, the infrastructure thereof is insufficient, so the WiFi infrastructure should be first constructed, and such a system is weak to any signal interference.

Therefore, it is urgent to develop a social safety network based on a new type position-based system wherein the functions for detecting the location of a user irrespective of the positions of the user, for example, even when the user is in an externally open space or in a city area or in the inside of a building can normally work, and the location of the user can be accurately detected, and the related facility cost or the like can be saved.

DISCLOSURE OF INVENTION

Technical Problem

Accordingly, the present invention is made to improve the above-mentioned problems. It is an object of the present invention to provide an address-based social safety network system of a smart grid infrastructure device and a method for producing the same, which make it possible to provide a more economical and accurate social safety network service in such a way to use an address-based relay device of a previously installed smart grid infrastructure device, for example, an electric power service network, etc. when providing a social safety network service.

Solution to Problem

To achieve the above objects, there is provided an address-based social safety network system of a smart grid infrastructure device, which may include a portable location information terminal which is configured to transmit an emergency signal through a RF modem, when an emergency signal generation command is received; a digital energy meter which is configured to calculate an average value of a wireless receiving strength of the emergency signal received from the portable location information terminal and transmit the average value to an upper end; a collection device which is configured to collect the emergency signals received from the digital energy meter and transmit to the upper end; and a positioning server which is configured to collect the emergency signals received from the collection device and recognize a location information of the portable location information terminal using an intrinsic identification address of the digital energy meter and the wireless receiving sensitivity.

To achieve the above object, there is provided an address-based social safety network system of a smart grid infrastructure device, which may include a portable location information terminal which is configured to transmit at a predetermined period a signal through a RF modem; a digital energy meter which is configured to calculate an average value of a wireless receiving strength of the emergency signal received from the portable location information terminal and transmit the average value to an upper end; a collection device which is configured to collect the signals received from the digital energy meter and transmit to the upper end; and a positioning server which is configured to collect the emergency signals received from the collection device and recognize a location information of the portable location information terminal using an intrinsic identification address and the wireless receiving sensitivity of the digital energy meter and judge as the occasion that an emergency signal is generated, when the portable location information terminal is departing from a set area for a predetermined time period, thus tracking the location of the portable location information terminal.

In more detail, it is characterized according to the above system in that the portable location information terminal can be formed integral with a cellular phone or can be connected to the cellular phone for the sake of operations.

In addition, it is characterized according to the above system in that the portable location information terminal can be formed in contact with a user's body or clothes or may be fixed thereat, and in case where the portable location information terminal is departing from the fixed position, an alarm sound and an emergency signal can generate.

In addition, it is characterized according to the above system in that on the portable location information terminal, a GPS module is mounted.

In addition, it is characterized according to the above system in that the digital energy meter can be mounted on any one among a distant meter reading network, an electric power supply and distribution automaton network and an electric power infrastructure network.

In addition, it is characterized according to the above system in that the positioning server is configured to first recognize a location information of the portable location information terminal, which has generated an emergency signal, using a wireless receiving sensitivity of the signal received from the digital energy meter and second obtain a more accurate location information of the portable location information terminal by using the GPS module which is mounted on the portable location information terminal.

In addition, it is characterized according to the above system in that the positioning server is configured to automatically report the location of the portable location information terminal to a related authority or a manager's portable location information terminal which locates near the potable location information terminal when an emergency signal occurs from the portable location information terminal.

In addition, it is characterized according to the above system in that the portable location information terminal and the digital energy meter are configured to communicate with each other in a RF communication way, and the digital energy meter and the collection device are configured to communicate with each other through a wired or wireless communication network in the way of any one among a binary CDMA, Zigbee, WiFi and PLC, and the collection device and the positioning server are configured to communicate with each other through a wired or wireless communication network in the way of any one among a binary CDMA, a mobile communication, TRS, an Ethernet, an optical communication, an internet communication, RF and HFC network.

To achieve the above object, there is provided a method for providing an address-based social safety network system of a smart grid infrastructure device, which may include a step wherein an emergency signal is transmitted through a RF modem when an emergency signal generation command is received from a portable location information terminal; a step wherein a digital energy meter calculates an average value of a wireless receiving strength of the emergency signal received from the portable location information terminal and transmits the average value to an upper end; a step wherein a collection device collects the emergency signals received from the digital energy meter and transmits to the upper end; and a step wherein a locating sever collects the emergency signals received from the collection device and recognizes a location information of the potable location information terminal using an intrinsic identification address of the digital energy meter and the wireless receiving sensitivity.

In order to achieve the above object, there is provided a method for providing an address-based social safety network system of a smart grid infrastructure device, which may include a step wherein a portable location information terminal transmits at a predetermined period a signal through a RF modem; a step wherein a digital energy meter calculates an average value of a wireless receiving strength of a signal received from the portable location information terminal and transmits the average value to an upper end; a step wherein a collection device collects the signals received from the digital energy meter and transmits to the upper end; and a step wherein a positioning server collects the signals received from the collection device and recognizes a location information of the portable location information terminal using an intrinsic identification address of the digital energy meter and the wireless receiving sensitivity and judges as the occasion that an emergency signal has generated if the portable location information terminal is departing from a set area for a predetermined time period, thus tracking the location of the portable location information terminal.

In more detail, it is characterized according to the above method in that the portable location information terminal can be formed integral with a cellular phone or can be connected to the cellular phone for the sake of operations.

In addition, it is characterized according to the above method in that the portable location information terminal can be formed in contact with a user's body or clothes or may be fixed thereat, and in case where the portable location information terminal is departing from the fixed position, an alarm sound and an emergency signal can generate.

In addition, it is characterized according to the above method in that on the portable location information terminal, a GPS module is mounted.

In addition, it is characterized according to the above method in that the digital energy meter can be mounted on any one among a distant meter reading network, an electric power supply and distribution automaton network and an electric power infrastructure network.

In addition, it is characterized according to the above method in that the positioning server is configured to first recognize a location information of the portable location information terminal, which has generated an emergency signal, using a wireless receiving sensitivity of the signal received from the digital energy meter and second obtain a more accurate location information of the portable location information terminal by using the GPS module which is mounted on the portable location information terminal.

In addition, it is characterized according to the above method in that the positioning server is configured to automatically report the location of the portable location information terminal to a related authority or a managers portable location information terminal which locates near the potable location information terminal when an emergency signal occurs from the portable location information terminal.

In addition, it is characterized according to the above method in that the portable location information terminal and the digital energy meter are configured to communicate with each other in a RF communication way, and the digital energy meter and the collection device are configured to communicate with each other through a wired or wireless communication network in the way of any one among a binary CDMA, Zigbee, WiFi and PLC, and the collection device and the positioning server are configured to communicate with each other through a wired or wireless communication network in the way of any one among a binary CDMA, a mobile communication, TRS, an Ethernet, an optical communication, an internet communication, RF and HFC network.

Advantageous Effects

According to the present invention, when providing a social safety network service, it is possible to use an address-based relay device of a previously installed smart grid infrastructure device, for example, an electric power facility network or the like. For this reason, very expensive initial investment cost for a new facility of a system can be greatly saved, while increasing to a maximum the efficiency of the system as compared with the costs.

In addition, since the location detection method which distinguishes based on the positional characteristics like an open place or a city area or the inside of a building can be used, the accuracy of the system can be greatly enhanced.

In conclusion, the comparison between the conventional location locating method and the location locating method according to an exemplary embodiment of the present invention is shown in the following table 1.

TABLE 1

|   |   | GPS | Mobile communication | WiFi | Smart grid of the present invention |
|---|---|---|---|---|---|
| Features | | LBS using satellite | LBS without shadow area using mobile communication network | LBS which can use WiFi network the construction of which is under way | LBS which can use distant meter reading infrastructure the construction of which is under way |
| Advantages | | The most accurate information provision among the current LBSs | Information can be provided without additional infrastructure and equipment no shadow area exists | Information can be provided if WiFi infrastructure is provided | Information can be provided without additional equipment if distant meter reading infrastructure is installed |
| Disadvantages | | Shadow area in a building or a basement | Error range of locating is wide | Construction of WiFi infrastructure is necessary | Accuracy is low where houses are not intense |
| Construction cost | Terminal | High | High | Middle | Low |
|  | Base station | None | High | Middle | Low |
|  | Total | Middle | High | Middle | Low |

BEST MODES FOR CARRYING OUT THE INVENTION

Figure 1:
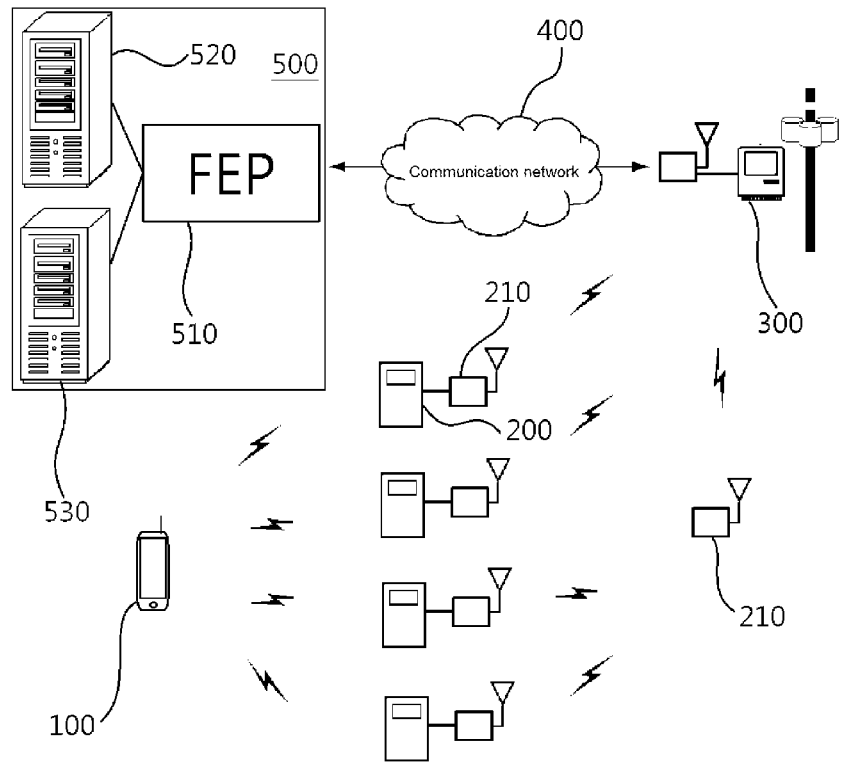
FIG. 1 is a view illustrating an address-based social safety network system of a smart grid infrastructure apparatus according to an exemplary embodiment of the present invention.

It is noted that the detailed description of the present invention refers to the accompanying drawings which illustrates as examples the specific exemplary embodiments with which the present invention can be implemented. These exemplary embodiments are described in detail to the extent that a person having ordinary skill in the art can easily implement. It should be understood that various exemplary embodiments of the present invention are different from each other, but don't need to be exclusive to each other. For example, specific shapes, structures and characteristics described herein may be implemented in the form of another exemplary embodiment without departing from the spirit and scope of the present invention. In addition, it should be also understood that the location and arrangement of individual component in each of the disclosed embodiments may be modified without departing from the spirit and scope of the invention. Therefore, as long as the detailed descriptions below is not intended to be interpreted as limitative meaning, the scope of the present invention, if properly described, is limited only by the following claim along with all the scopes equivalent to what the claims say. The similar reference numbers in the drawings represent the same or similar function in terms of various views.

The terms used in the present specification is used so as to describe specific exemplary embodiments, not intended to limit the present invention. The expression in the form of a single should be interpreted to mean the inclusion of multiple expressions unless otherwise it says differently according to the context. It should be understood that the terms "comprise" or "have" used in the present specification are intended to express any presence of an installed feature, number, step, operation, configuration component, partial component or a combination thereof, not to previously exclude any possible presence of one or more than one features, number, step, operation, configuration component, partial part or a combination thereof or additional possibility.

It should be understood that all the terms used herein including technical or scientific terms, unless otherwise stated, have the same meaning as what are in general understood by a person having ordinary skill in the art belonging to the present invention. The terms same as what are defined in the dictionary, which is in general used, should be interpreted as having the same meaning as the meaning that the related technology has according to the context, and is not interpreted as ideally or overly typical meaning, unless otherwise defined differently.

The exemplary embodiments of the present invention will be described with reference to the accompanying drawings in detail to the extent that a person having ordinary skill in the art belonging to the present invention can easily implement.

The distant meter reading technology wherein the meter of a house that uses electric power can be distantly read, which will be the basis of the present invention, draws an attention as one of the smart grid technologies which are considered important for preventing the global warming by increasing energy efficiency. For this reason, many countries and companies are substantially developing and installing a corresponding system. The region where such a distant meter reading system is installed may be formed of a USN (Ubiquitous Sensor Network) covering the inside and outside of the house. In addition, the distant meter reading system may provide the USN as well as useful information, for example, customer addresses or location information.

The applicant of the present invention is endlessly conducting a research and development on the distant meter reading system. As a result, the applicant invented and filed an invention the application number of which is 10-2009-0121511, the filing date being Dec. 9, 2009, the title being 'A distant meter reading system using a binary CDMA technology with DLMS', and received the registration decision on May 31, 2010. In addition, the applicant invented and filed an invention the application number of which is 10-2010-0001925, the filing date being Jan. 8, 2010, the title being 'A distant meter reading system using a binary CDMA technology', and received the registration decision on May 17, 2010. In order to more accurately describe the spirit, in particular the configuration and function of each component of the present invention, it is natural that the above two inventions should be referred. It should be understood that the technical concepts included in the above two inventions are coincided with the present invention.

The present invention is directed to a system and method for providing a social safety network service by using the wired or wireless communication network which forms various electric power service network the including above distant meter reading system.

Configuration of Entire System

FIG. 1 is a view illustrating an address-based social safety network system of a smart grid infrastructure device according to an exemplary embodiment of the present invention.

Referring to FIG. 1, the social safety network system according to the present invention may include a location information terminal 100 that a user carries, a digital energy meter 210 wherein it may be connected to various smart grid infrastructure devices 200, which have been previously provided, or may be independently provided, thus receiving an emergency signal from the portable location information terminal 100, analyzing the emergency signal, recognizing the information of the received signal, calculating the average value of a receive signal strength indicator (RSSI), storing the calculated value and transferring to an upper end, a connection device 300 wherein it receives a wireless receiving sensitivity of the portable location information terminal 100 from a plurality of digital energy meters 210 through at least one transfer procedure and arranges and transfer to the upper end, and a positioning server 500 wherein it analyzes the data including a wireless receiving sensitivity of the portable location information terminal 100 transmitted from the collection device 300 and the intrinsic identification address of the digital energy meter and the GPS information, which is used as an auxiliary information, thus calculating the location information of the portable location information terminal 100, storing the location information separately in each portable location information terminal, judging the kinds of the emergency signal and the traffic line of the portable location information terminal 100 based on the stored location information, and reporting the emergency signal to a related authority near the portable location information terminal 100 or the terminal of a corresponding manager.

In more detail, the portable location information terminal 100 according to an exemplary embodiment of the present invention is a digital device. Any portable digital device may be used as the portable location information terminal 100 of the present invention as long as it includes a memory unit as in a personal computer (for example, a tablet computer, a laptop computer, etc.), a PDA, a wed pad, a mobile telephone, etc. and mounts thereon a microprocessor which will be used for calculation ability. More preferably, the portable location information terminal 100 may be configured integral with the cellular phone or may operate after it is connected to the cellular phone.

In addition, the portable location information terminal 100 may be configured contacting with a user's body or clothes or fixed thereat. If the portable location information terminal is departing from a fixed position, it may generate an alarm sound or an emergency signal generation command.

In addition, the portable location information terminal 100 may be equipped with a GPS module. The GPS information of the portable location information terminal 100 obtained through it allows to more accurately recognize the wireless receiving sensitivity as well as the location information of the portable location information terminal 100. The detailed configuration of the portable location information terminal 100 will be described below with reference to FIG. 2.

When an emergency signal occurs, the portable location information terminal 100 transmits the emergency signal to the digital energy meter 210 based on the RF communication method.

Meanwhile, the digital energy meter 210 is provided at the smart grid infrastructure device 200, thus distantly measuring, recording and processing various meter reading and control information and measuring and providing the wireless receiving sensitivity of the portable location information terminal 100. In addition, alternately the digital energy meter 210 may be configured independently, thus operating as an AP which can measure the wireless receiving sensitivity of the portable location information terminal 100 and provides the location information, not performing any meter reading function.

When an emergency signal is received from the portable location information terminal 100, the digital energy meter 210 calculates and stores the average value of the wireless receiving sensitivity and transmits to the collection device 300 through various wired or wireless communication networks, for example, a binary CDMA, Zigbee, WiFi, PLC, etc. At this time, the digital energy meter 210 may work as a relay in the course of data communication, so the emergency signal transmitted from the portable location information terminal 100 can be transmitted to the collection device 300 through at least one digital energy meter 210. The detailed configuration of the digital energy meter 210 will be described below in detail with reference to FIG. 3.

The collection device 300 receives, from the digital energy meter 210, various meter reading information and emergency signal through one communication terminal among various wired or wireless communication networks, for example, a binary CDMA, Zigbee, WiFi, PLC, etc. and collects the wireless receiving sensitivity by the portable location information terminal 100 and the intrinsic identification address of the digital energy meter 210 and transmits to the positioning server server 500. The collection device 300 can transmit the above data to the positioning server 500 through one wired or wireless communication network 400 among a binary CDMA, a mobile communication, TRS, Ethernet, an optical communication, an internet network, RF or HFC.

The positioning server 500 may include a FEP (Front End Protocol) 510 which recognizes a message from the collection device 300 and transfers a packet to a corresponding server based on its purpose, a meter reading server 520 which collects the meter reading information of the smart grid infrastructure device 200 from the collection server 300, and a social safety network server 530 which receives an emergency signal from the portable location information terminal 100 and obtains a location information of the portable location information terminal 100 and transmits to the managing authority or the manager terminal, thus providing a social safety network service.

The FEP 510 recognizes the kind of the packet from the collection device 300 and performs a switching function for transferring to the meter reading server 520 if the kind corresponds to the meter reading information or to the social safety network server 530 if the kind corresponds to the emergency signal.

The meter reading server 520 records and keeps the meter reading information with respect to each smart grid infrastructure device 200 from a plurality of the collection devices 300 and charges some fee for a corresponding smart grid infrastructure device 200, if necessary. The above-described meter reading function may be performed in the way that the meter reading server 520 reads the DCU 320 using a key communication network in the same way as in the conventional art.

Meanwhile, if the packet inputted from the FEP 510 to the DCU 320 is judged as being an emergency signal, the packet is transferred to the social safety network server 530. The social safety network server 530 first recognizes the location information of the portable location information terminal 100, where the emergency signal has occurred, using the wireless receiving sensitivity of the portable location information terminal 100 from the digital energy meter 210. The way for recognizing the location information of the portable location information terminal 100 using the wireless receiving sensitivity may be performed in such a way that based on the fact that the wireless receiving sensitivity becomes stronger as a signal is received from the portable location information terminal 100 which is located near the digital energy meter 210, a plurality of the digital energy meters 210 located at the periphery of the portable location information terminal 100 receive the signal from one portable location information terminal, and the wireless receiving sensitivity received from each digital energy meter 210 is analyzed, thus approximately estimating the location of the portable location information terminal 100. If the GPS module is provided at the portable location information terminal 100, it is possible to secondarily obtain more accurate location information of the portable location information terminal using the GPS module. Next, a corresponding fact is instantly transferred to the related authority or the managers terminal. In this case, the notification on the occurrence of the emergency signal may be performed by the units of Dong, Myeon, Eup, etc. and may be performed in cooperation with a police substation and a police station or a rescue team of a fire station. When the collection device 300 obtains the location information of the portable location information terminal 100 using the wireless receiving sensitivity, the GPS information coming from a person which is on the way may be additionally transferred, thus providing more accurate location information of the portable location information terminal 100.

Structure of Portable Location Information Terminal

Figure 2:
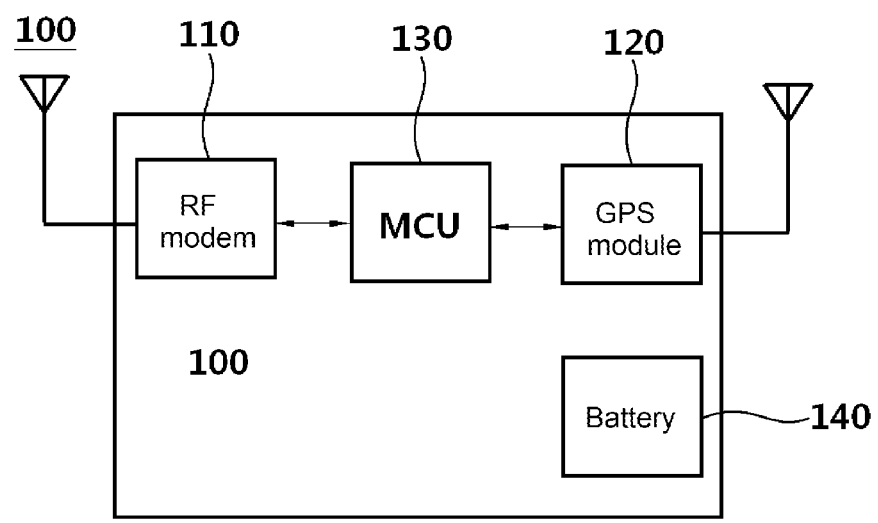
FIG. 2 is a view illustrating a configuration of a portable location information terminal according to an exemplary embodiment of the present invention.

FIG. 2 is a view illustrating a configuration of a portable location information terminal according to an exemplary embodiment of the present invention.

Referring to FIG. 2, the portable location information terminal 100 may include a RF modem 110, a GPS module 120, a MCU 130 and a battery 140.

The RF modem 110 performs the functions for transmitting and receiving the data packets of the digital energy meter 210 and the portable location information terminal 100 and may server to support the CSM-CA.

The GPS module 120 may be used so as to recognize an accurate location information of the portable location information terminal 100 irrespective of the wireless receiving sensitivity and may be designed attachable to or detachable from the portable location information terminal 100, if necessary.

The MCU 130 obtains a location information of the portable location information terminal 100 by operating the GPS module 120 and controls the data transmission and reception procedure with the digital energy meter 210 by controlling the operations of the RF mode 110. The portable location information terminal 100 may be configured contactable with a user's body or clothes or fixed thereat. If the portable location information terminal is departing from a fixed position, the MCU 130 may generate an alarm sound or may transmit an emergency signal generation command to the digital energy meter 210. If such an emergency signal is transmitted, the authentication may be finished if the digital energy meter 210 receives two or more than two times packet after the location information packet is transmitted 3 times continuously.

In addition, the user's location information may be transmitted to the digital energy meter 210 at a regular period or a random period in addition to the occasion where the user artificially transmits such an emergency signal. In this case, it may be judged as the occasion where the emergency had occurred if the portable location information terminal 100 has departed from a predetermined area for more than a set time period, thus tracking the location of the portable location information terminal.

Meanwhile, if the portable location information terminal 100 transmits a data for obtaining the user's location information, the wireless receiving sensitivity is first transmitted, and the location information obtained through the GPS module 120 is second transmitted, so that the social safety network server 530 may obtain more accurate location information.

The battery 140 may be made of a cell battery. In this case, it may be used for more than one year. The system may be designed so that the manager can be informed of an exchanging time of the battery 140 using the low battery alarming function.

The portable location information terminal 100 may be manufactured in various forms depending on the use purpose. For example, it may be manufactured in the type of a wrist-wearing type, an ankle-wearing type, a waist-wearing type, a neck-wearing type, a hair band type, a cellular phone accessory type, a bag strap type, etc. The types of the portable location information terminal 100 may variously change depending on the user's choice.

Structure of Digital Enemy Meter

Figure 3:
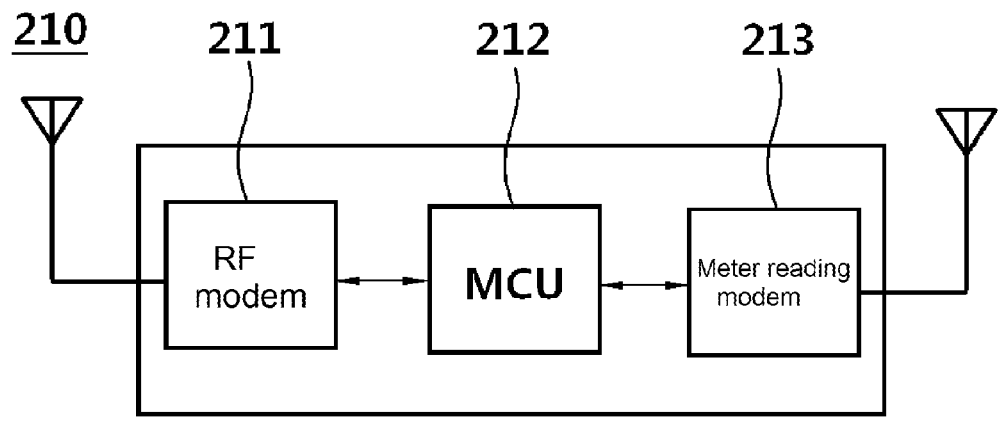
FIG. 3 is a view illustrating a configuration of a digital energy meter according to an exemplary embodiment of the present invention.

FIG. 3 is a view illustrating a structure of a digital energy meter according to an exemplary embodiment of the present invention.

Referring to FIG. 3, the digital energy meter 210 of the present invention is intended to include an electronic type electricity meter and a smart meter for the AMI (Advanced Metering Infrastructure) and may include a RF modem 211, a MCU (Micro Controller Unit 212, a meter reading model 213, for example, a binary CMDA or a PLC.

The RF modem 211 supports the communication in the RF method with the portable location information terminal 100 which forms a lower end, and the meter reading modem 213 supports the communication by various wired or wireless methods, for example, a binary CDMA, Zigbee, WiFi, PLC, etc. with the collection device 300 which forms an upper end. The communication with the portable location information terminal 100 is performed using the RF modem 211, and the communication with the collection device 300 is performed using the meter reading modem 213, thus preventing any confusion during the communication between the upper end and the lower end.

Each modem used as a meter reading modem, a meter reading data relay modem, an electric power automation data transmission modem, etc. may be used as a repeater for obtaining a user's location information depending on the kinds of the digital energy meter 210. For this, according to the spirits of the present invention, an additional base station is not necessary during the transmission and reception procedure of the data packet.

The digital energy meter 210 is installed adjacent the smart grid infrastructure device 200 which is provided at each house that uses electric power, thus collecting meter reading information from the smart grid infrastructure device 200 and transmitting to the collection device 300 through the wired or wireless communication network. The data may be transmitted using a plurality of repeaters which are provided on the wired or wireless communication network depending on the distance between the digital energy meter 210 and the collection device 300. At this time, other digital energy meters 210 may perform the function of the repeater. Therefore, the digital energy meter 210 may be formed in the form of an independent type terminal which can process only the location information, not installed at the smart grid infrastructure device 200. In this case, the digital energy meter 210 operates as the AP dedicated to the location information. Therefore, the digital energy meter 210 may be installed at any one among the distant meter reading network, the electric power supply and distribution automation network or the electric power infrastructure network.

Meanwhile, the collection device 300 and each digital energy meter 210 may be configured to operate as a master and a slave, respectively. Each device may be authenticated for the sake of reliable data communication procedure. In addition, in order to enhance the data transfer speed, they may be interconnected in a multi-connection way. In addition, it is possible for the collection device 300 to upgrade at a time a plurality of the digital energy meters 210.

Except for the meter reading function performed using the MCU 212 and the meter reading modem 213, the digital energy meter 210 may perform the functions for receiving an emergency signal from the portable location information terminal 100, measuring a wireless receiving sensitivity, calculating the average value and creating a data which may be used as a basic data for obtaining the location information of the portable location information terminal 100. For this operation, the RF modem 211 using the same RF as the portable location information terminal 100 in terms of hardware is inserted in or installed at the digital energy meter 210, thus communicating with the portable location information terminal 100. In terms of software, the MCU 212 analyzes the message received from the RF modem 211, thus obtaining a wireless receiving sensitivity data using the analyzed message. In other words, the MCU 212 recognizes the information of the message received from the portable location information terminal 100 and analyzes the RF wireless receiving sensitivity, etc. included in the message and processes into the form of a packet protocol that the social safety network server 530 can interpret and transfers to the collection device 300 through the meter reading modem 213. In other words, the digital energy meter 210 recognizes the information of the data received from the portable location information terminal 100 and calculates and stores the average value of the wireless receiving sensitivity.

It is advantageous that the digital energy meter 210 has a low locating error as compared with the mobile communication method or the WiFi method and may be used indoors since electric power can be easily obtained and it may be constituted based on various electric power infrastructures by installing the location information RF modem 211 in the electric power infrastructure. In addition, it is advantageous that the installation of the location signal RF modem is easier than that in the conventional method together with economical matters.

Except for the digital energy meter 210, the installation location of the location information RF modem 211 may be all kinds of facilities of an electric power infrastructure, for example, a collection device, an automation terminal device of an electric power supply and distribution network, an electric transformer, a street light, an IHD and a repeater device, an electric charging station, an electric power facility monitoring device, etc. The installation location thereof may be expandable even to a piped water meter or a gas meter.

Structure of Collection Device

Figure 4:
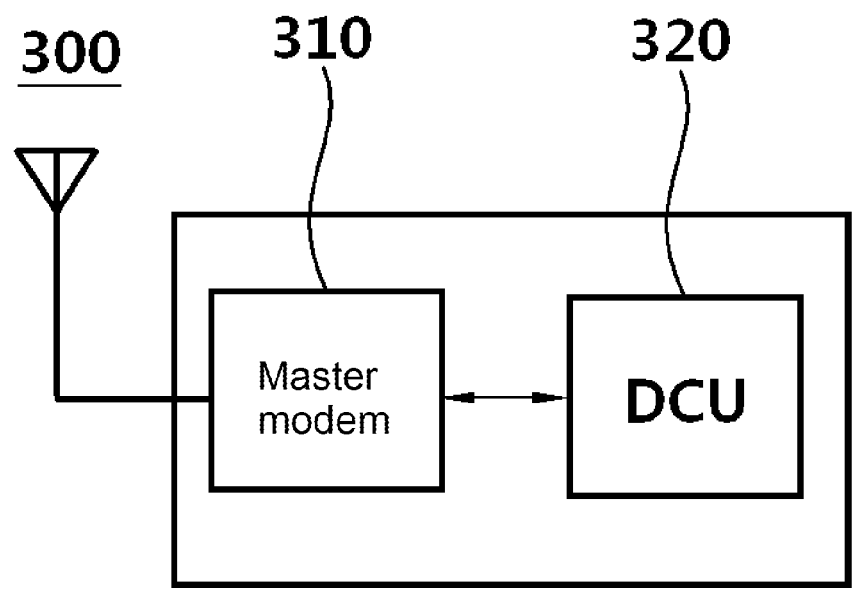
FIG. 4 is a view illustrating a configuration of a collection device according to an exemplary embodiment of the present invention.

FIG. 4 is a view illustrating a structure of a collection device according to an exemplary embodiment of the present invention.

Referring to FIG. 4, the collection device 300 according to the present invention may include a master modem 310 and a DCU (Data Concentration Unit 320. The structure of the collection device 300 may have the same configuration as the collection device 300 in terms of their physical configuration, the collection device 300 being used at the conventional distant meter reading, provided that in this case, a software may be additionally installed in the collection device 300 so as to provide a user location recognition function of the social safety network system. Therefore, the meter reading function of the collection device 300 may be performed in the same way as the conventional way of using the mater modem 310 and the DCU 320.

In order to implement the social safety network, the software additionally installed in the DCU 320 collects the emergency signals from a plurality of the digital energy meters 210 and transfers the intrinsic identification address of the digital energy meter 210 and the wireless receiving sensitivity to the positioning server 500. The packet received from a plurality of the digital energy meters 210 in such a way is processed as one information by the DCU 320 and is provided to the positioning server 500 which provides the social safety network service.

The collection device 300 can communicate with the digital energy meter 210, which is the lower end, through various wired or wireless communication networks, for example, a binary CDMA, Zigbee, WiFi, PLC, etc. When it needs to communicate between the collection devices 300, the communication can be performed through a binary CDMA relay, etc.

Operations of Entire System

Figure 5:
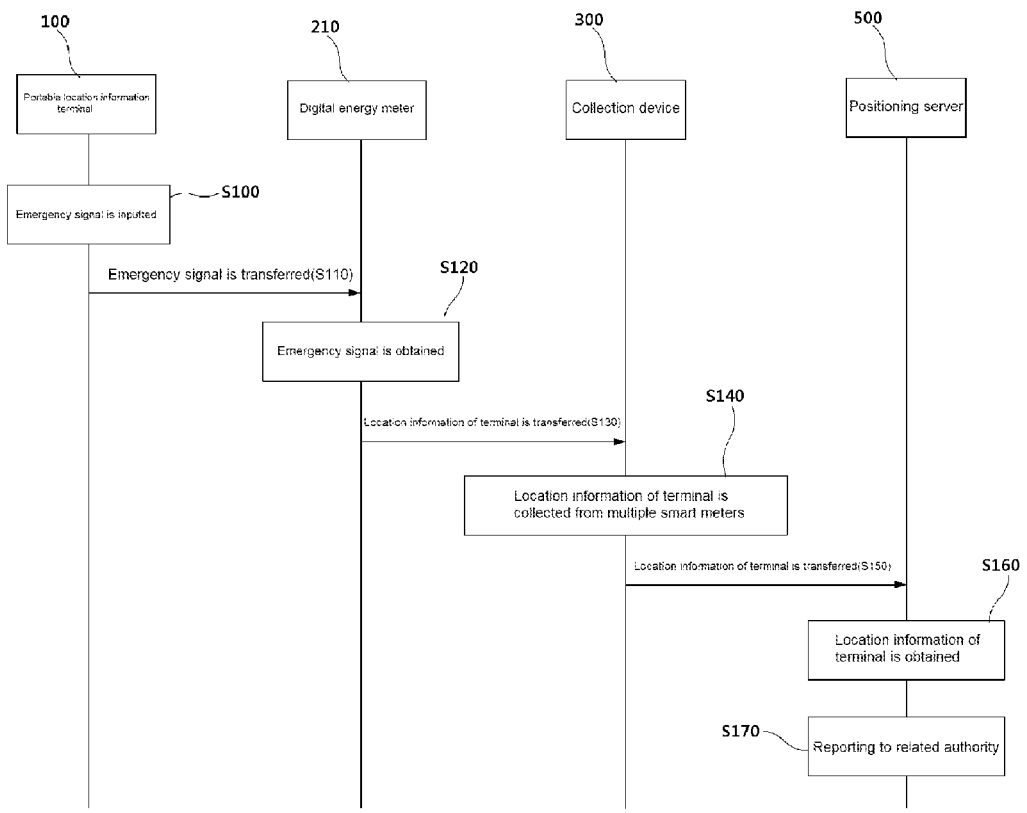
FIG. 5 is a view for describing a method for providing an address-based social safety network of a smart grid infrastructure device according to an exemplary embodiment of the present invention.

FIG. 5 is a view for describing a method for providing an address-based social safety network of a smart grid infrastructure device according to an exemplary embodiment of the present invention.

Referring to FIG. 5, when an emergency signal inputs in the portable location information terminal 100 from the user (S100), the portable location information terminal 100 transmits the emergency signal through the RF modem to the digital energy meter 210 which is connected to the smart grid infrastructure device 200 or is independently provided (S110). In this case, the wireless communication method used for a data transmission and reception between the portable location information terminal 100 and the digital energy meter 210 may be a typical RF which can be implemented relatively simple at low cost.

The digital energy meter 210 obtains a wireless receiving sensitivity information from the portable location information terminal 100 which has received the emergency (S120). At this time, the user's location information may be calculated based on the intrinsic identification addresses of the digital energy meter 210 around the portable location information terminal 100. If more accurate location information is additionally necessary, the GPS information may be used.

The digital energy meter 210 processes into the form of packets the time the message of a corresponding user receives, the information of a wireless receiving sensitivity, etc., the intrinsic identification address of the digital energy meter 210, etc. and transmits to the collection device 300 (S130). A corresponding packet may be transferred to the collection device 300 through a wired or wireless communication network in the way of any one among a binary CDMA, Zigbee, WiFi, PLC, etc.

The collection device 300 collects a plurality of packet messages received from a plurality of digital energy meters 210 and processes and merges into one information packet (S140) and transfers it to the positioning server 500 through a wired or wireless communication network 400, for example, a binary CDMA, a mobile communication, TRS, an Ethernet, an optical communication, an internet network, RF or HFC network (S150).

The positioning server 500 collects the emergency signal received from the collecting device 300 through the FEP 510 and obtains a location information of the portable location information terminal 100 using the intrinsic identification address of the digital energy meter 210 and the wireless receiving sensitivity (S160). Preferably, the positioning server 500 may first recognize the location information of the portable location information terminal 100, which has the emergency signal, using the wireless receiving sensitivity of the signal transferred from the digital energy meter 210 and may second obtain a more accurate location information of the portable location information terminal 100 by utilizing the GPS module 120 provided in the portable location information terminal 100.

In addition, when an emergency signal occurs in the portable location information terminal 100, the positioning server 500 may automatically report the location of the portable location information terminal 100 to the related authority or the managers portable location information terminal 100 which locates near the portable location information terminal 100 (S170). Namely, the positioning server 500 quickly reports the location information of the user to a corresponding related authority or the manager's terminal, where needs such location information, thus allowing the social safety network server 530 to do take a necessary action so as to cope with any dangerous situation.

Figure 6:
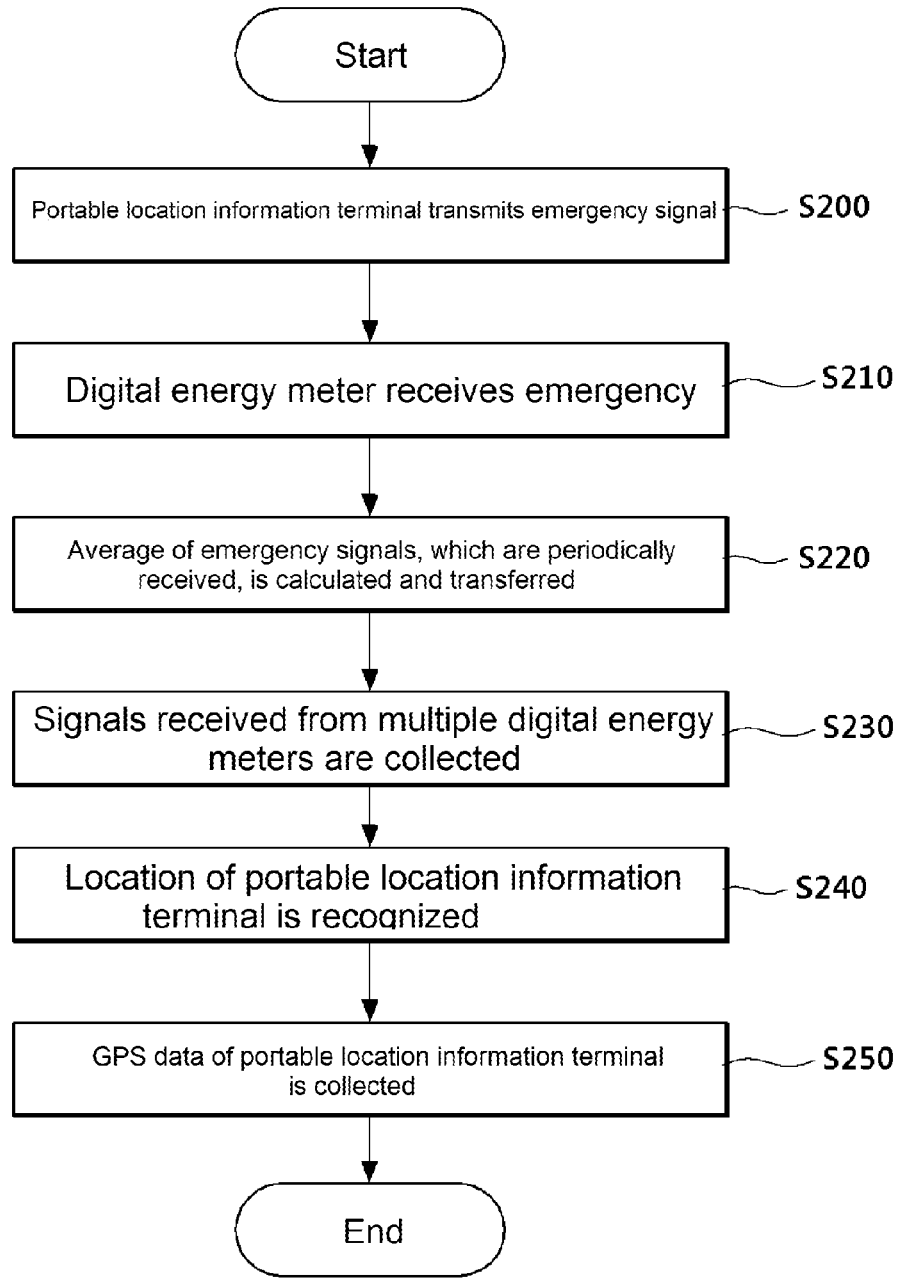
FIG. 6 is a flow chart for describing a method for collecting a location information of a potable location information terminal in a digital energy meter according to an exemplary embodiment of the present invention.

Method for Obtaining Location Information of Portable Location Information Terminal FIG. 6 is a flow chart for describing a method for obtaining a location information of the portable location information terminal from the digital energy meter according to an exemplary embodiment of the present invention.

Referring to FIG. 6, when an emergency signal is transmitted from the portable location information terminal 100 (S200), the digital energy meter 210 connected to the smart grid infrastructure device 200 which locates near the portable location information terminal 100 receives such an emergency signal (S210). The digital energy meter 210, which has received the emergency signal, calculates an average value of the signals which come in periodically and transmit the average value to the collection device 300 (S220). In the earlier mentioned way, the collection device 300 collects and stores in the DCU 320 the signals which are transmitted a lot simultaneously from a plurality of the digital energy meter 210 and transmits to the positioning server 500 (S230). The positioning server 500 recognizes the location of the portable location information terminal 100 by comparing the intrinsic identification address of the digital energy meter 210 and the wireless receiving sensitivity, which has transmitted the emergency signal, and the reception time, etc. (S240). More specifically, the positioning server 500 may first obtain an estimated distance to the portable location information terminal 100 and the digital energy meter 210 using the wireless receiving sensitivity so as to calculate the location of the portable location information terminal 100. The stronger the wireless receiving sensitivity, the shorter, the distance thereto. So, it is possible to calculate the location of the portable location information terminal 100 by comparing the wireless receiving sensitivities between one portable location information terminal 100 and at least three digital energy meters 210 which locate near the portable location information terminal 100. Even in case where the location information of the portable location information terminal 100 is obtained in this way, it is possible to obtain more accurate location information by operating the GPS module 120 provided in the portable location information terminal 100 (S250).

Meanwhile, the emergency signal transmitted from the portable location information terminal 100 may contain an ID for identifying the terminal and a message type. Since the ID matches with the intrinsic number of each terminal, it may be used to form a database of the moving tracks of each terminal, and the message type may have a function of telling what kind of emergency signal has occurred.

Figure 7:
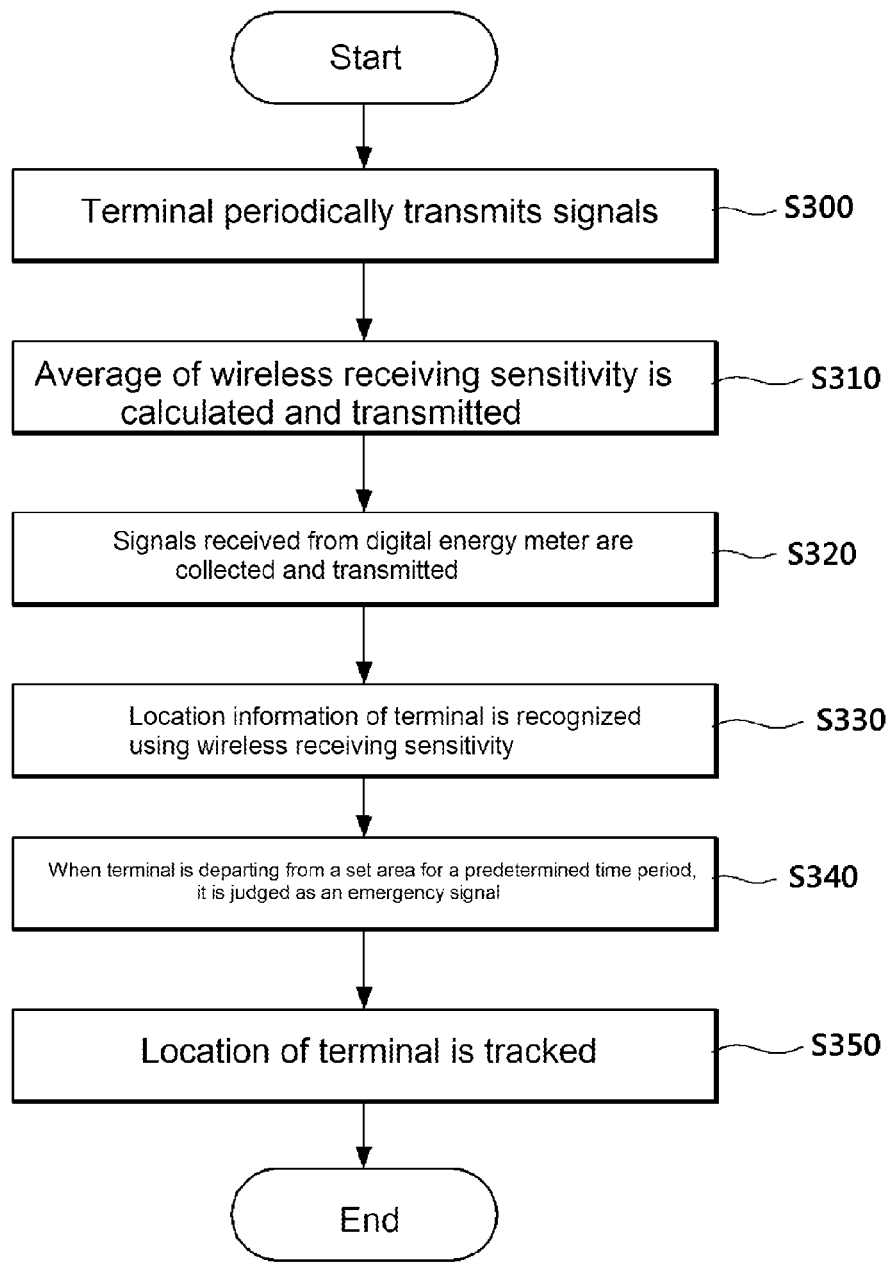
FIG. 7 is a flow chart for describing a method for collecting a location information of a portable location information terminal in a digital energy meter according to another exemplary embodiment of the present invention.

FIG. 7 is a flow chart for describing a method for obtaining a location information of a portable location information terminal in a digital energy meter according to another exemplary embodiment of the present invention.

Referring to FIG. 7, when the portable location information terminal 100 transmits at a predetermined period a signal through the RF modem 110 (S300), the digital energy meter 210 calculates an average value of the wireless receiving sensitivity of the signal received from the portable location information terminal 100 and transmits the average value to the upper end (S310). The collection device 300 collects the signals received from the digital energy meter 210 and transmits to the upper end (S320). The positioning server 500 collects the signals transmitted from the collection device 300 and recognizes the location information of the portable location information terminal 100 using the intrinsic identification address of the digital energy meter 210 and the wireless receiving sensitivity (S330), and if the portable location information terminal 100 is departing from a set area for a predetermined time period, it is judged that an emergency signal is generated (S340), and the location of the portable location information terminal 100 is tracked (S350). The method for tracking the location of the portable location information terminal 100 is the same as the method described with reference to FIG. 6.

The above-described exemplary embodiments of the present invention may be implemented in the form of a program command which can be executed by various computer components and may be recorded on a computer readable recording medium. Here, the computer readable recording medium may include program commands, data files, data structures and a combination thereof in a single form or multiple forms. The program commands recorded on the computer readable recording medium may be specially designed or constituted for the sake of the present invention or may be disclosed to and usable by a person having ordinary skill in the art. The examples of the computer readable recording medium may be a hardware device specially constituted to store or execute the program commands, for example, a magnetic medium like a hard disk, a floppy disk, a magnetic tape, etc., and an optical recording medium like CD-ROM and DVD, a magnetic-optical media like floptical disk, and ROM, RAM, flash memory, etc. The examples of the program commands include machine language codes made by a complier as well as a high level language code which can be executed by a user by using an interpreter, etc. The hardware device can be constituted so that it can operate by at least one software module so as to perform the processes of the present invention, and vice versa.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims.

Therefore all changes and modifications that fall within the meets and bounds of the claims, or equivalences of such meets and bounds are therefore intended to be embraced by the appended claims.

The invention claimed is:

1. An address-based social safety network system of a smart grid infrastructure device, comprising:
 a portable location information terminal which is configured to transmit an emergency signal through a RF modem, when an emergency signal generation command is inputted;
 a digital energy meter which is configured to calculate an average value of a wireless receiving strength of the emergency signal received from the portable location information terminal and transmit the average value to an upper end;
 a collection device which is configured to collect the emergency signals received from the digital energy meter and transmit to the upper end; and
 a positioning server which is configured to collect the emergency signals received from the collection device and recognize a location information of the portable location information terminal using the average value of a wireless receiving strength of the emergency signal transmitted by the portable location information terminal and an intrinsic identification address of the digital energy meter, wherein the emergency signal transmitted from the portable location information terminal contains an ID for identifying the portable location information terminal and a message type.

2. The system of claim 1, wherein the portable location information terminal can be formed integral with a cellular phone or can be connected to the cellular phone for the sake of operations.

3. The system of claim 1, wherein the portable location information terminal can be formed in contact with a user's body or clothes or may be fixed thereat, and in case where the portable location information terminal is departing from the fixed position, an alarm sound and an emergency signal can generate.

4. The system of claim 1, wherein on the portable location information terminal, a GPS module is mounted.

5. The system of claim 4, wherein the positioning server is configured to first recognize a location information of the portable location information terminal, which has generated an emergency signal, using a average value of a wireless receiving strength of the signal received from the digital energy meter and second obtain a more accurate location information of the portable location information terminal by using the GPS module which is mounted on the portable location information terminal.

6. The system of claim 1, wherein the digital energy meter can be mounted on any one among a distant meter reading network, an electric power supply and distribution automaton network and an electric power infrastructure network.

7. The system of claim 1, wherein the positioning server is configured to automatically report the location of the portable location information terminal to a related authority or a manager's portable location information terminal which locates near the potable location information terminal when an emergency signal occurs from the portable location information terminal.

8. The system of claim 1, wherein the portable location information terminal and the digital energy meter are configured to communicate with each other in a RF communication way, and the digital energy meter and the collection device are configured to communicate with each other through a wired or wireless communication network in the way of any one among a binary CDMA, Zigbee, WiFi and PLC, and the collection device and the positioning server are configured to communicate with each other through a wired or wireless communication network in the way of any one among a binary CDMA, a mobile communication, TRS, an Ethernet, an optical communication, an internet communication, RF and HFC network.

9. An address-based social safety network system of a smart grid infrastructure device, comprising:
a portable location information terminal which is configured to transmit at a predetermined period a signal through a RF modem;
a digital energy meter which is configured to calculate an average value of a wireless receiving strength of the emergency signal received from the portable location information terminal and transmit the average value to an upper end;
a collection device which is configured to collect the signals received from the digital energy meter and transmits to the upper end; and
a positioning server which is configured to collect the emergency signals received from the collection device and recognize a location information of the portable location information terminal using the average value of a wireless receiving strength and an intrinsic identification address of the digital energy meter and judge as the occasion that an emergency signal is generated, when the portable location information terminal is departing from a set area for a predetermined time period, thus tracking the location of the portable location information terminal,
wherein the emergency signal transmitted from the portable location information terminal contains an ID for identifying the portable location information terminal and a message type.

10. A method for providing an address-based social safety network system of a smart grid infrastructure device, comprising:
a step wherein an emergency signal is transmitted through a RF modem when an emergency signal generation command is received from a portable location information terminal;
a step wherein a digital energy meter calculates an average value of a wireless receiving strength of the emergency signal received from the portable location information terminal and transmits the average value to an upper end;
a step wherein a collection device collects the emergency signals received from the digital energy meter and transmits to the upper end; and
a step wherein a locating sever collects the emergency signals received from the collection device and recognizes a location information of the potable location information terminal using an intrinsic identification address of the digital energy meter and the average value of a wireless receiving strength,
wherein the emergency signal transmitted from the portable location information terminal contains an ID for identifying the portable location information terminal and a message type.

11. The method of claim 10, wherein the portable location information terminal can be formed integral with a cellular phone or can be connected to the cellular phone for the sake of operations.

12. The method of claim 10, wherein the portable location information terminal can be formed in contact with a user's body or clothes or may be fixed thereat, and in case where the portable location information terminal is departing from the fixed position, an alarm sound and an emergency signal can generate.

13. The method of claim 10, wherein on the portable location information terminal, a GPS module is mounted.

14. The method of claim 13, wherein the positioning server is configured to first recognize a location information of the portable location information terminal, which has generated an emergency signal, using a wireless receiving sensitivity of the signal received from the digital energy meter and second obtain a more accurate location information of the portable location information terminal by using the GPS module which is mounted on the portable location information terminal.

15. The method of claim 10, wherein the digital energy meter can be mounted on any one among a distant meter reading network, an electric power supply and distribution automaton network and an electric power infrastructure network.

16. The method of claim 10, wherein the positioning server is configured to automatically report the location of the portable location information terminal to a related authority or a manager's portable location information terminal which locates near the potable location information terminal when an emergency signal occurs from the portable location information terminal.

17. The method of claim 10, wherein the portable location information terminal and the digital energy meter are configured to communicate with each other in a RF communication way, and the digital energy meter and the collection device are configured to communicate with each other through a wired or wireless communication network in the way of any one among a binary CDMA, Zigbee, WiFi and PLC, and the collection device and the positioning server are configured to communicate with each other through a wired or wireless communication network in the way of any one among a binary CDMA, a mobile communication, TRS, an Ethernet, an optical communication, an internet communication, RF and HFC network.

18. A method for providing an address-based social safety network system of a smart grid infrastructure device, comprising:

a step wherein a portable location information terminal transmits at a predetermined period a signal through a RF modem;

a step wherein a digital energy meter calculates an average value of a wireless receiving strength of a signal received from the portable location information terminal and transmits the average value to an upper end;

a step wherein a collection device collects the signals received from the digital energy meter and transmits to the upper end; and a step wherein a positioning server collects the signals received from the collection device and recognizes a location information of the portable location information terminal using an intrinsic identification address of the digital energy meter and the average value of a wireless receiving strength and judges as the occasion that an emergency signal has generated if the portable location information terminal is departing from a set area for a predetermined time period, thus tracking the location of the portable location information terminal, wherein the emergency signal transmitted from the portable location information terminal contains an ID for identifying the portable location information terminal and a message type.

* * * * *